US006467366B1

(12) United States Patent
Gierc

(10) Patent No.: US 6,467,366 B1
(45) Date of Patent: Oct. 22, 2002

(54) YOKE BEARING ASSEMBLY FOR HYDRAULIC POWER ASSIST RACK AND PINION POWER STEERING SYSTEM

(75) Inventor: Daniel B. Gierc, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/697,823

(22) Filed: Oct. 26, 2000

(51) Int. Cl.[7] .................................................. B62D 3/12
(52) U.S. Cl. ............................. 74/422; 74/409; 74/498; 384/58
(58) Field of Search ..................... 74/422, 498, 89.17, 74/409; 384/58, 416, 418, 419

(56) References Cited

U.S. PATENT DOCUMENTS

| 4,121,844 A | * 10/1978 | Nemoto et al. ............. 403/134 |
| 4,724,717 A | 2/1988 | Chikuma |
| 5,058,448 A | 10/1991 | Kiyooka et al. |
| 5,983,742 A | 11/1999 | Morris et al. |

FOREIGN PATENT DOCUMENTS

| DE | 29 13 641 | * 10/1980 |
| JP | 11-227616 | * 8/1999 |
| JP | 11-334609 | * 12/1999 |

* cited by examiner

Primary Examiner—William C Joyce
(74) Attorney, Agent, or Firm—Tarolli, Sundheim, Covell, Tummino & Szabo L.L.P.

(57) ABSTRACT

A rack and pinion steering gear assembly (10) for a vehicle comprises a housing (12) having a rack chamber (24) and a bearing chamber (35). The housing (12) has opposed slots (40, 42) opening into the bearing chamber (35). A rack (14) is movable in the rack chamber (24) in the housing (12) to effect steering movement of steerable wheels of the vehicle. A rotatable pinion (20) is in meshing engagement with the rack (14). An axle (70) located in the bearing chamber (35) in the housing (12) has opposite end portions (74, 76) located in the opposed slots (40, 42) in the housing. A bearing (60) is in engagement with the rack (14) and is supported on the axle (70) for rotation in the bearing chamber (35). A cover (90) supported on the housing (12) engages the axle (70) to hold the bearing (60) in engagement with the rack (14) and to hold the rack in engagement with the pinion (20).

13 Claims, 2 Drawing Sheets

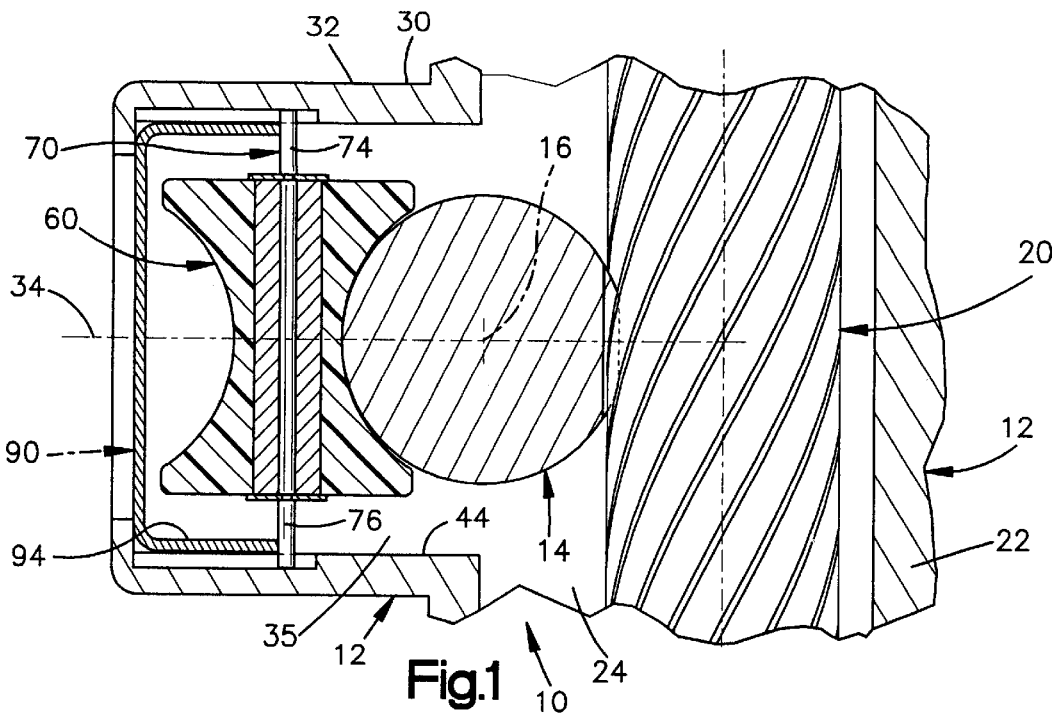
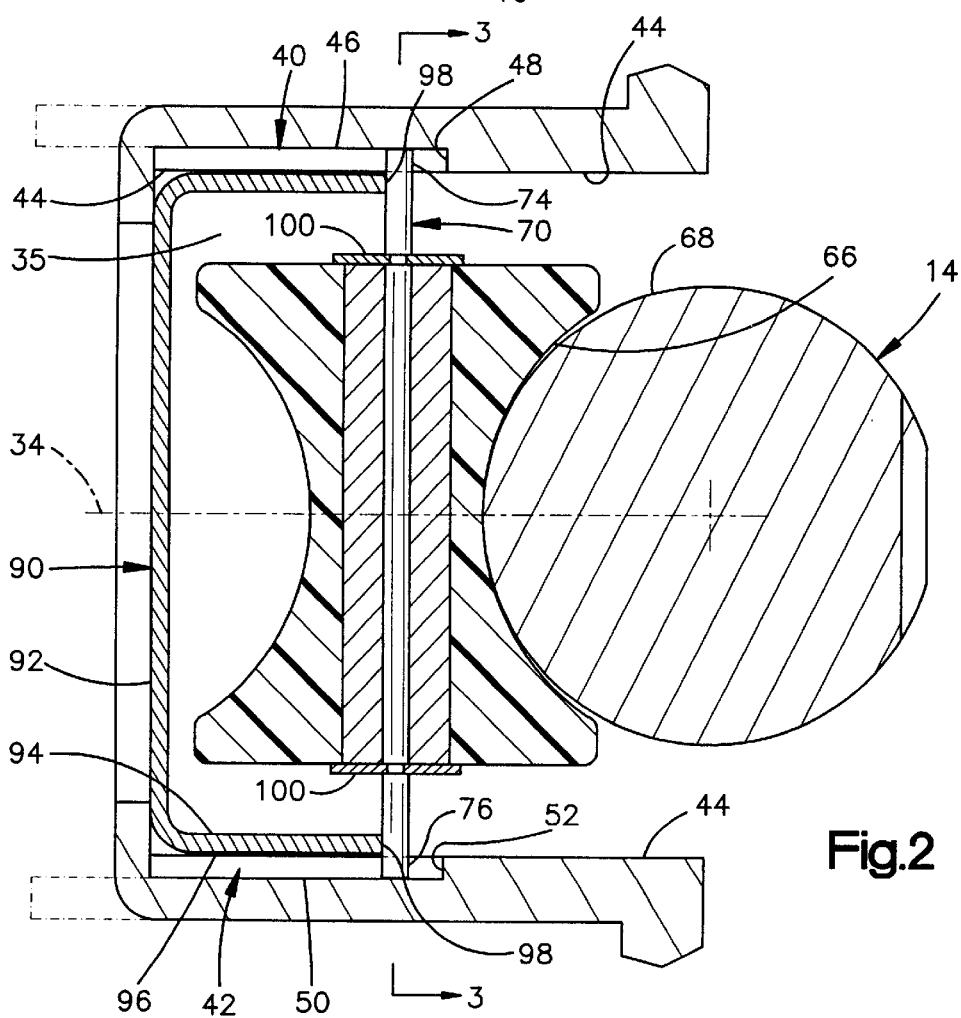

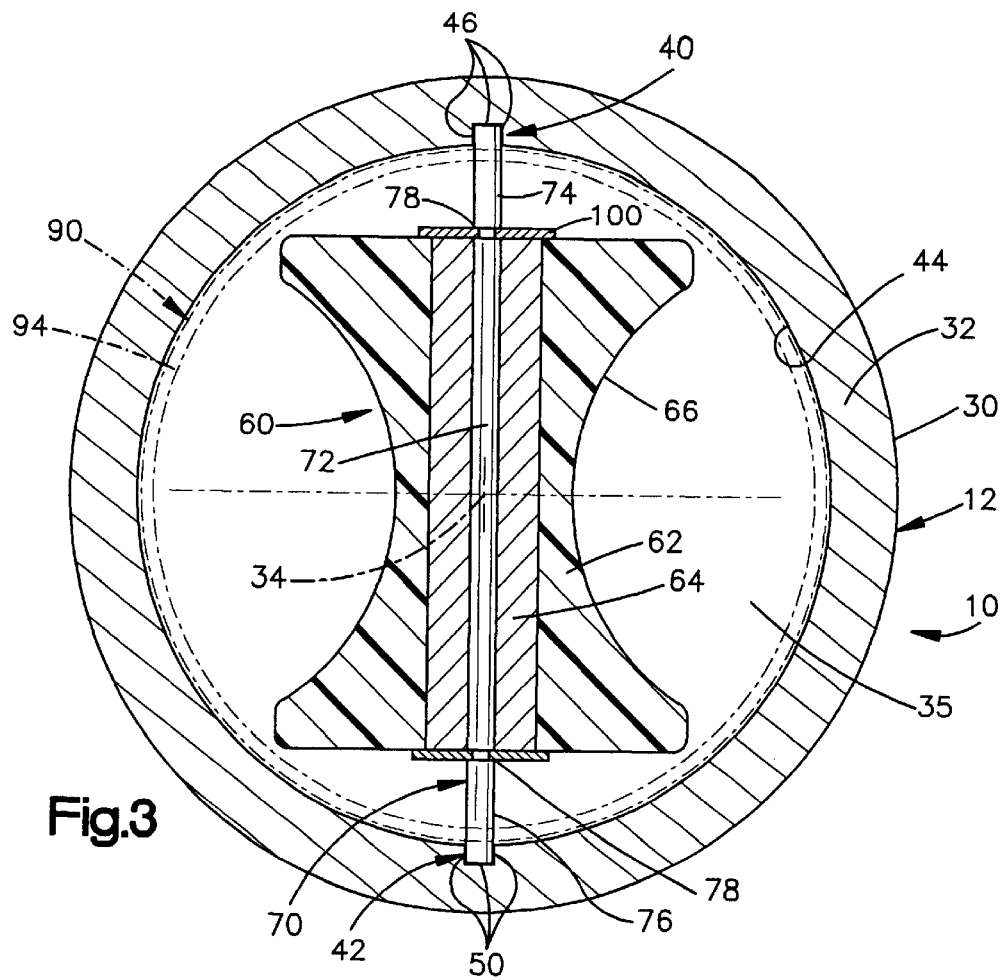
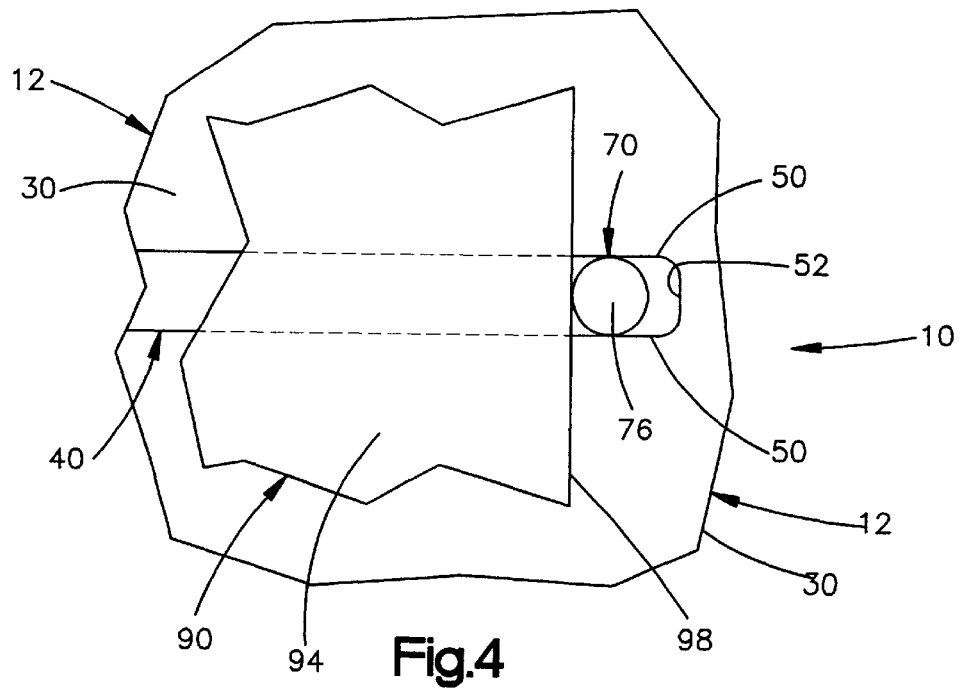

YOKE BEARING ASSEMBLY FOR HYDRAULIC POWER ASSIST RACK AND PINION POWER STEERING SYSTEM

BACKGROUND OF THE INVENTION

1. Technical Field

The present invention relates to a yoke bearing assembly for a hydraulic power assist steering gear assembly. In particular, the present invention relates to a hydraulic power assist rack and pinion steering gear assembly that includes an assembly for maintaining a yoke bearing in position against the rack to press the rack against the pinion.

2. Description of the Prior Art

A typical hydraulic power assist rack and pinion steering gear assembly includes a yoke bearing that is engaged with the rack and that holds the rack in position against the pinion. It is important to have the correct amount of force on the bearing, pressing the rack against the pinion. Many different ways of maintaining the bearing in position against the rack are known.

SUMMARY OF THE INVENTION

The present invention is a rack and pinion steering gear assembly for a vehicle, comprising a housing having a rack chamber and a bearing chamber. The housing has opposed slots opening into the bearing chamber. A rack is movable in the rack chamber in the housing to effect steering movement of steerable wheels of the vehicle. A rotatable pinion is in meshing engagement with the rack. An axle located in the bearing chamber in the housing has opposite end portions located in the opposed slots in the housing. A bearing is in engagement with the rack and is supported on the axle for rotation in the bearing chamber. A cover supported on the housing engages the axle to hold the bearing in engagement with the rack and to hold the rack in engagement with the pinion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a sectional view of a portion of a hydraulic power assist rack and pinion steering gear assembly, taken in a direction along the axis of the rack, constructed in accordance with the present invention;

FIG. 2 is an enlarged view of a portion of FIG. 1;

FIG. 3 is a view taken along line 3—3 of FIG. 2; and

FIG. 4 is a schematic view of a portion of the assembly of FIG. 1.

DESCRIPTION OF AN EMBODIMENT OF THE INVENTION

The present invention relates to a yoke bearing assembly for a hydraulic power assist steering gear assembly. In particular, the present invention relates to a hydraulic power assist rack and pinion steering gear assembly that includes an assembly for maintaining a yoke bearing in position against the rack to press the rack against the pinion. As representative of the present invention, FIG. 1 illustrates a portion of a hydraulic power assist rack and pinion steering gear assembly 10.

The steering gear assembly 10 includes a housing 12. A steering member in the form of a rack 14 is supported by and is movable relative to the housing 12 along a longitudinal central axis 16 of the rack. Opposite ends of the rack 14 are connected by suitable linkage with steerable wheels (not shown) of the vehicle. Upon movement of the rack 14 relative to the housing 12, the steerable wheels of the vehicle are turned in a known manner.

The rack 14 is in engagement with a pinion 20. Upon rotation of the vehicle steering wheel (not shown), a control valve causes a hydraulic motor to move the rack 14 in a direction along the axis 16 and to drive the pinion 20 in a follow-up manner. The control valve returns to a neutral condition when the steerable wheels of the vehicle have been turned to an extent corresponding to rotation of the steering wheel.

The housing 12 (FIG. 1) includes a rack portion 22. The rack portion 22 defines a rack chamber 24. The rack 14 is axially movable in the rack chamber 24.

The housing 12 also includes a yoke portion 30. The yoke portion 30 of the housing 12 projects from the rack portion 22 in a direction normal to the rack axis 16. The yoke portion 30 of the housing 12 has a cylindrical side wall 32 centered on an axis 34. The yoke portion 30 of the housing 12 defines a bearing chamber 35.

A pair of slots 40 and 42 are formed in the side wall 32 of the yoke portion 30 of the housing 12. The slots 40 and 42 extend along the inner side surface 44 of the side wall 32, in a direction parallel to the axis 34. The slots 40 and 42 extend radially outward from the inner side surface 44. The slots 40 and 42 open into the bearing chamber 35. The first slot 40 is defined by three parallel side surfaces 46 and a bottom end surface 48 (FIG. 2). The second slot 42 is defined by three parallel side surfaces 50 and a bottom end surface 52. The second slot 42 is diametrically opposite the first slot 40.

The steering assembly 10 includes a two-piece bearing 60 supported for rotation on an axle 70. The axle 70 is a metal shaft having a central portion 72 and first and second opposite end portions 74 and 76. A pair of snap ring grooves 78 are located near the end portions 74 and 76.

The two-piece bearing 60 includes an outer portion 62 and an inner portion 64. The outer portion 62 of the bearing 60 has a concave surface 66 adapted for engagement with the back surface 68 of the rack 14. The inner portion 64 of the bearing 60 has a cylindrical configuration located inside the outer portion 62. The inner portion 62 of the bearing 60 is rotatably supported on the central portion 72 of the axle 70.

The assembly also includes a cover 90. The cover 90 is a one-piece component, preferably made from metal. The cover 90 has a cap-shaped configuration including a circular end wall 92 and a cylindrical side wall 94. The side wall 94 has a cylindrical outer surface 96 and an annular end surface 98 that extends parallel to the end wall 92.

To assemble the steering gear 10, the two-piece bearing 60 is first mounted on the axle 70. Two snap rings 100 are placed in the snap ring grooves 78. The snap rings 100 locate the bearing 60 axially on the axle 70, and prevent axial movement of the bearing on the axle. The snap rings 100 are low-friction devices to minimize inhibition of rolling of the bearing 60 on the axle 70. The end portions 74 and 76 of the axle 70 project from the bearing 60.

The sub-assembly of the axle 70 and the bearing 60 is then placed in the yoke housing 30 (shown in dot-dash lines in FIG. 2 in a condition before assembly). Specifically, the first end portion 74 of the axle 70 is placed in the first slot 40, and the second end portion 76 of the axle 70 is placed into the second slot 42. The axle 70 is slid along the length of the yoke housing 30, moving the bearing 60 into and along the bearing chamber 35, in a direction parallel to the axis 34, until the bearing surface 66 contacts the rack surface 68.

When this contact between the bearing 60 and the rack 14 occurs, the first end portion 74 of the axle 70 is spaced from and not in engagement with the bottom end surface 48 of the first slot 40. The second end portion 76 of the axle 70 is spaced from and not in engagement with the bottom end surface 52 of the second slot 42.

After the bearing 60 contacts the rack 14, the cover 90 is inserted into the yoke housing 30. The outer side surface 96 of the side wall 94 of the cover 90 slides along the inner side surface 44 of the side wall 32 of the housing 30, with a press fit. The cover 90 is moved into the yoke housing 30, in a direction parallel to the axis 34, until the annular end surface 98 of the cover engages the first and second end portions 74 and 76 of the axle 70. This engagement provides line contact between the cover 90 and the axle 70 at two locations, as shown at in FIG. 4.

The engagement of the cover 90 with the axle 70 holds the bearing 60 in engagement with the rack 14 and thus holds the rack in engagement with the pinion 20. The cover 90 is pressed into the bearing chamber 35 in the housing 30 with a predetermined amount of force. The predetermined amount of force is that amount necessary for the cover 90, acting through the axle 70 and bearing 60, to hold the rack 14 in engagement with the pinion 20 with the desired amount of force.

After the cover 90 is in the correct location, an outer end portion 102 of the yoke housing 30 is deformed inwardly as shown in solid lines in FIG. 2. The housing end portion 102 engages the end wall 92 of the cover 90 and holds the cover in a predetermined position in the housing 30, so that the cover continues to exert the predetermined amount of force on the axle 70. The assembly 10 does not need or include any springs for biasing the bearing 60 into engagement with the rack 14.

From the above description of the invention, those skilled in the art will perceive improvements, changes and modifications in the invention. For example, the cover may be threaded into the housing, and rotatable in the housing into engagement with the axle. Such improvements, changes and modifications within the skill of the art are intended to be covered by the appended claims.

Having described the invention, I claim:

1. A rack and pinion steering gear assembly for a vehicle, comprising:
   a housing having a rack chamber and a bearing chamber, said housing having opposed slots opening into said bearing chamber;
   a rack movable in said rack chamber in said housing to effect steering movement of steerable wheels of the vehicle;
   a rotatable pinion in meshing engagement with said rack;
   an axle in said bearing chamber in said housing, said axle having opposite end portions located in said opposed slots in said housing;
   a bearing in engagement with said rack and supported on said axle for rotation in said bearing chamber; and
   a cover supported on said housing, said cover engaging said axle to hold said bearing in engagement with said rack and to hold said rack in engagement with said pinion.

2. A steering gear assembly as set forth in claim 1 wherein said housing has a portion that is deformed into engagement with said cover to hold said cover in a predetermined position in said housing.

3. A steering gear assembly as set forth in claim 2 wherein said cover is press fitted into a predetermined position in said bearing chamber in said housing.

4. A steering gear assembly as set forth in claim 3 wherein said cover is press fitted in said bearing chamber with a predetermined load thereby causing said rack to exert a predetermined load on said pinion.

5. A steering gear assembly as set forth in claim 1 wherein said cover is rotatable relative to said housing to move said cover in said housing into engagement with said axle.

6. A steering gear assembly as set forth in claim 1 wherein said cover has an annular end surface that engages each one of said axle end portions with line contact.

7. A steering gear assembly as set forth in claim 1 wherein said bearing chamber has a cylindrical configuration defined by a cylindrical surface centered on an axis, said slots extending radially outward from said cylindrical surface, said slots being diametrically opposed to each other about said axis.

8. A steering gear assembly as set forth in claim 1 wherein each one of said slots has a bottom end surface, said end portions of said axle being spaced from said bottom end surfaces of said slots.

9. A steering gear assembly as set forth in claim 1 wherein said cover biases said bearing into engagement with said rack, and said assembly is free of springs for biasing said bearing into engagement with said rack.

10. A rack and pinion steering gear assembly for a vehicle, comprising:
    a housing having a rack chamber, said housing also having a cylindrical surface centered on an axis and defining a cylindrical bearing chamber in said housing;
    a rack movable in said rack chamber in said housing to effect steering movement of steerable wheels of the vehicle;
    a rotatable pinion in meshing engagement with said rack;
    an axle in said bearing chamber in said housing;
    a bearing in engagement with said rack and supported on said axle for rotation in said bearing chamber; and
    a one-piece cover having a cylindrical side wall press fitted inside said cylindrical surface of said housing and having a circular end wall capping said side wall;
    said housing having a portion that is deformed into engagement with said end wall of said cover to hold said cover in a predetermined position in said housing in engagement with said axle thereby causing said rack to exert a predetermined load on said pinion.

11. A rack and pinion steering gear assembly for a vehicle, comprising:
    a housing having a rack chamber, said housing also having a cylindrical surface centered on an axis and defining a cylindrical bearing chamber in said housing;
    a rack movable in said rack chamber in said housing to effect steering movement of steerable wheels of the vehicle;
    a rotatable pinion in meshing engagement with said rack;
    an axle in said bearing chamber in said housing;

a bearing in engagement with said rack and supported on said axle for rotation in said bearing chamber; and a one-piece cover having a cylindrical side wall press fitted inside said cylindrical surface of said housing and having a circular end wall capping said side wall;

said housing having a portion that is deformed into engagement with said end wall of said cover to hold said cover in a predetermined position in said housing in engagement with said axle thereby causing said rack to exert a predetermined load on said pinion;

wherein said axle has end portions that project from said bearing, and said cover has an annular end surface that engages each one of said axle end portions with line contact.

12. A steering gear assembly as set forth in claim 11 wherein said housing has opposed slots opening into said bearing chamber, said axle end portions projecting into said slots in said housing to block rotation of said axle and said bearing about said axis.

13. A steering gear assembly as set forth in claim 12 wherein each one of said slots has a bottom end surface, said end portions of said axle being spaced from said bottom end surfaces of said slots.

* * * * *